(12) United States Patent
e Silva et al.

(10) Patent No.: US 10,127,805 B2
(45) Date of Patent: Nov. 13, 2018

(54) CACHING PROGRAMMING DATA

(71) Applicant: Ray Enterprises LLC, Wilmington, DE (US)

(72) Inventors: Bernardo Ferreira de Carvalho e Silva, Brooklyn, NY (US); Daniel Cristiano Rocha, Sao Paulo (BR); David Skokna, Brooklyn, NY (US)

(73) Assignee: Ray Enterprises LLC, Wilmington, DE (US)

( * ) Notice: Subject to any disclaimer, the term of this patent is extended or adjusted under 35 U.S.C. 154(b) by 0 days.

(21) Appl. No.: 14/744,076

(22) Filed: Jun. 19, 2015

(65) Prior Publication Data

US 2015/0373397 A1 Dec. 24, 2015

Related U.S. Application Data

(60) Provisional application No. 62/014,952, filed on Jun. 20, 2014.

(51) Int. Cl.
*H04N 7/173* (2011.01)
*G08C 17/02* (2006.01)
(Continued)

(52) U.S. Cl.
CPC ............. *G08C 17/02* (2013.01); *G08C 23/04* (2013.01); *H04N 5/4403* (2013.01); *H04N 5/44543* (2013.01); *H04N 21/25808* (2013.01); *H04N 21/25891* (2013.01); *H04N 21/42207* (2013.01); *H04N 21/42208* (2013.01); *H04N 21/42224* (2013.01); *H04N 21/42225* (2013.01); *H04N 21/42226* (2013.01); *H04N 21/4312* (2013.01);
(Continued)

(58) Field of Classification Search
CPC .................................................. H04N 21/4755
See application file for complete search history.

(56) References Cited

U.S. PATENT DOCUMENTS 6,407,779 B1 6/2002 Herz
8,006,263 B2 8/2011 Ellis et al.
(Continued)

FOREIGN PATENT DOCUMENTS

WO 01/01699 1/2001

*Primary Examiner* — Olugbenga O Idowu
(74) *Attorney, Agent, or Firm* — Eversheds Sutherland (US) LLP

(57) ABSTRACT

Systems and methods for facilitating caching of programming data are provided herein, including receiving two or more programming data portions, storing the respective programming data portions, managing access to the storage component or the communication component based on programming data portions stored within the storage component, and generating a sleep signal based on a period of inactivity which exceeds an inactivity threshold. In one or more embodiments, caching of programming data may include determining a programming data set based on user profile data, parsing the programming data set into two or more programming data portions, converting respective programming data portions into a format based on a remote configuration, transmitting a first programming data portion of the respective programming data portions, and transmitting additional programming data portions of the respective programming data portions based on a sleep signal.

20 Claims, 6 Drawing Sheets

(51) Int. Cl.

| | | |
|---|---|---|
| *G08C 23/04* | (2006.01) | |
| *H04N 21/433* | (2011.01) | |
| *H04N 21/45* | (2011.01) | |
| *H04N 5/44* | (2011.01) | |
| *H04N 5/445* | (2011.01) | |
| *H04N 21/258* | (2011.01) | |
| *H04N 21/431* | (2011.01) | |
| *H04N 21/482* | (2011.01) | |
| *H04N 21/422* | (2011.01) | |
| *H04N 21/81* | (2011.01) | |
| *H04N 21/458* | (2011.01) | |
| *H04N 21/475* | (2011.01) | |

(52) U.S. Cl.
CPC ..... *H04N 21/4316* (2013.01); *H04N 21/4331* (2013.01); *H04N 21/4532* (2013.01); *H04N 21/4586* (2013.01); *H04N 21/475* (2013.01); *H04N 21/4821* (2013.01); *H04N 21/4826* (2013.01); *H04N 21/8186* (2013.01); *G08C 2201/10* (2013.01); *G08C 2201/20* (2013.01); *G08C 2201/21* (2013.01); *G08C 2201/30* (2013.01); *G08C 2201/50* (2013.01); *G08C 2201/92* (2013.01); *H04N 2005/443* (2013.01); *H04N 2005/44556* (2013.01)

(56) References Cited

U.S. PATENT DOCUMENTS

| | | | |
|---|---|---|---|
| 8,615,573 B1* | 12/2013 | Walsh | G06F 17/30817 |
| | | | 707/777 |
| 2002/0180894 A1 | 12/2002 | Okajima et al. | |
| 2003/0093813 A1 | 5/2003 | Shintani et al. | |
| 2005/0071323 A1* | 3/2005 | Gabriel | G06F 17/30817 |
| 2008/0005764 A1* | 1/2008 | Arling | H04H 60/46 |
| | | | 725/39 |
| 2008/0195664 A1* | 8/2008 | Maharajh | G06F 17/30035 |
| 2010/0013551 A1* | 1/2010 | Reams | H04N 5/4403 |
| | | | 327/544 |
| 2011/0022780 A1* | 1/2011 | Wakrat | G06F 12/0246 |
| | | | 711/103 |
| 2012/0102530 A1 | 4/2012 | Quan | |
| 2012/0159557 A1* | 6/2012 | Kim | H04N 21/43615 |
| | | | 725/81 |

* cited by examiner

CACHING PROGRAMMING DATA

CROSS-REFERENCE TO RELATED APPLICATIONS

This application claims the benefit of U.S. Provisional Patent Application, Ser. No. 62/014,952 entitled "UNIVERSAL REMOTE CONTROL", filed on Jun. 20, 2014; the entirety of the above-noted application is incorporated by reference herein.

BACKGROUND

Communication between a remote and a set top box or other system generally occurs. Generally, remote controls may include infrared (IR) blasters which send signals of infrared radiation in order to control functions such as power, volume, tuning, channel selection, etc. Remote controls are usually small wireless handheld devices with a plurality of buttons (e.g., hardware buttons or soft buttons) for adjusting various settings such as television channel, volume, and power. However, communication between a remote and other systems may cause power consumption, thereby reducing the battery life for the remote.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

According to one or more aspects, a system for parsing programming data may include a network component receiving user profile data and determining a programming data set based on the user profile data, a parsing component parsing the programming data set into two or more programming data portions, a formatting component converting respective programming data portions into a format based on a remote configuration, wherein the network component transmits a first programming data portion of the respective programming data portions, and a control component receiving a sleep signal, wherein the network component transmits additional programming data portions of the respective programming data portions based on the sleep signal.

The user profile data may include a zip code and a content provider. The first programming data portion of the respective programming data portions may be associated with two days of programming data. A second programming data portion of the additional programming data portions may be associated with twelve days of programming data. The remote configuration may be associated with an operating system of a remote. The parsing component may parse the programming data set into the respective programming data portions based on file sizes of respective programming data portions. Respective programming data portions may include channel names, program names, or identifiers.

According to one or more aspects, a method for facilitating caching of programming data may include determining a programming data set based on user profile data, parsing the programming data set into two or more programming data portions, converting respective programming data portions into a format based on a remote configuration, transmitting a first programming data portion of the respective programming data portions, and transmitting additional programming data portions of the respective programming data portions based on a sleep signal.

The user profile data may include a zip code and a content provider. The first programming data portion of the respective programming data portions may be associated with two days of programming data. A second programming data portion of the additional programming data portions may be associated with twelve days of programming data. Respective programming data portions may include channel names, program names, or identifiers.

According to one or more aspects, a system for caching programming data may include a communication component receiving two or more programming data portions, a storage component storing the respective programming data portions, a management component managing access to the storage component or the communication component based on programming data portions stored within the storage component, and a power component generating a sleep signal based on a period of inactivity which exceeds an inactivity threshold.

The system may include a display component rendering a user interface and one or more portions of one or more of the programming data portions. The system may include an application component gathering user profile data.

The user profile data may include a zip code and a content provider. A first programming data portion of the respective programming data portions may be associated with two days of programming data. A second programming data portion of the additional programming data portions may be associated with twelve days of programming data. Respective programming data portions may include channel names, program names, or identifiers. The system may include a cable box or a set top box.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
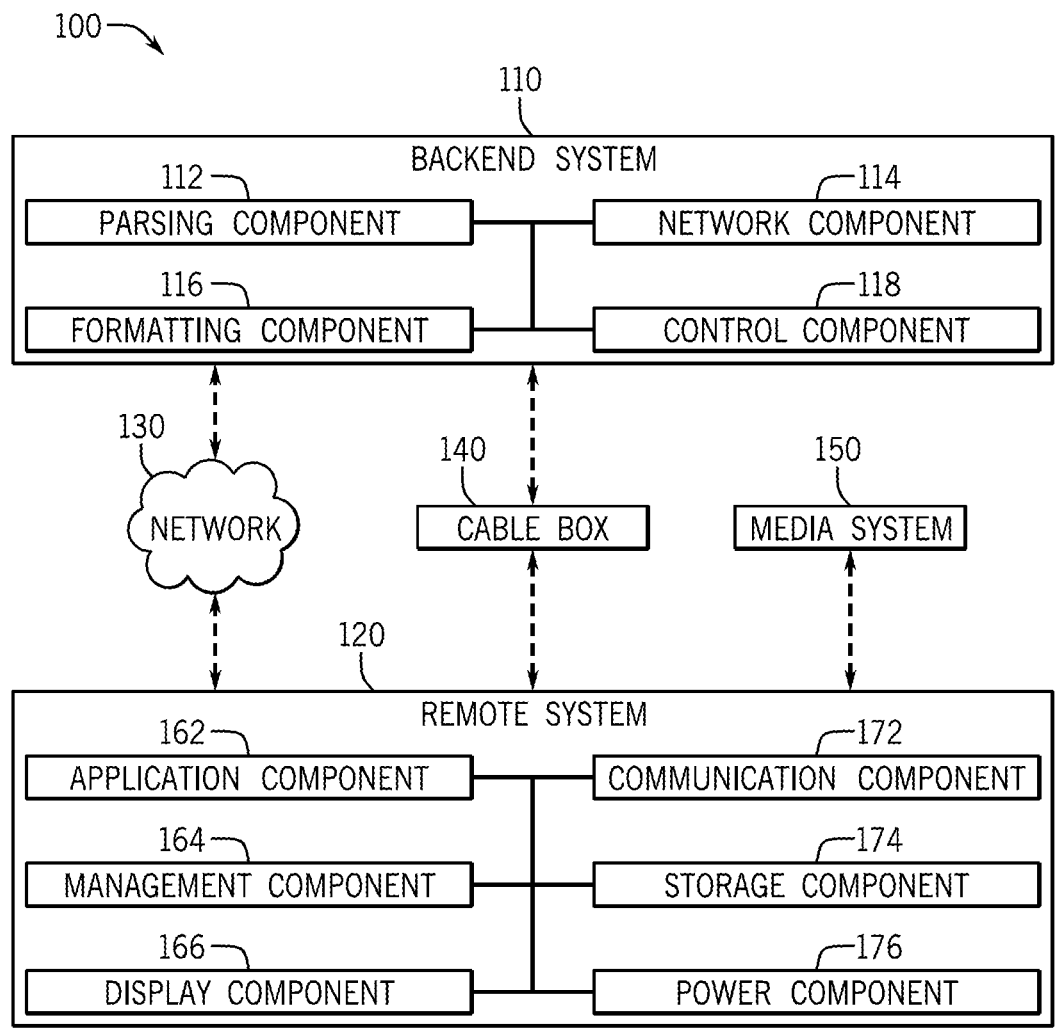
FIG. 1 is an illustration of an example component diagram of a backend system facilitating caching of programming data on a remote system, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 6:
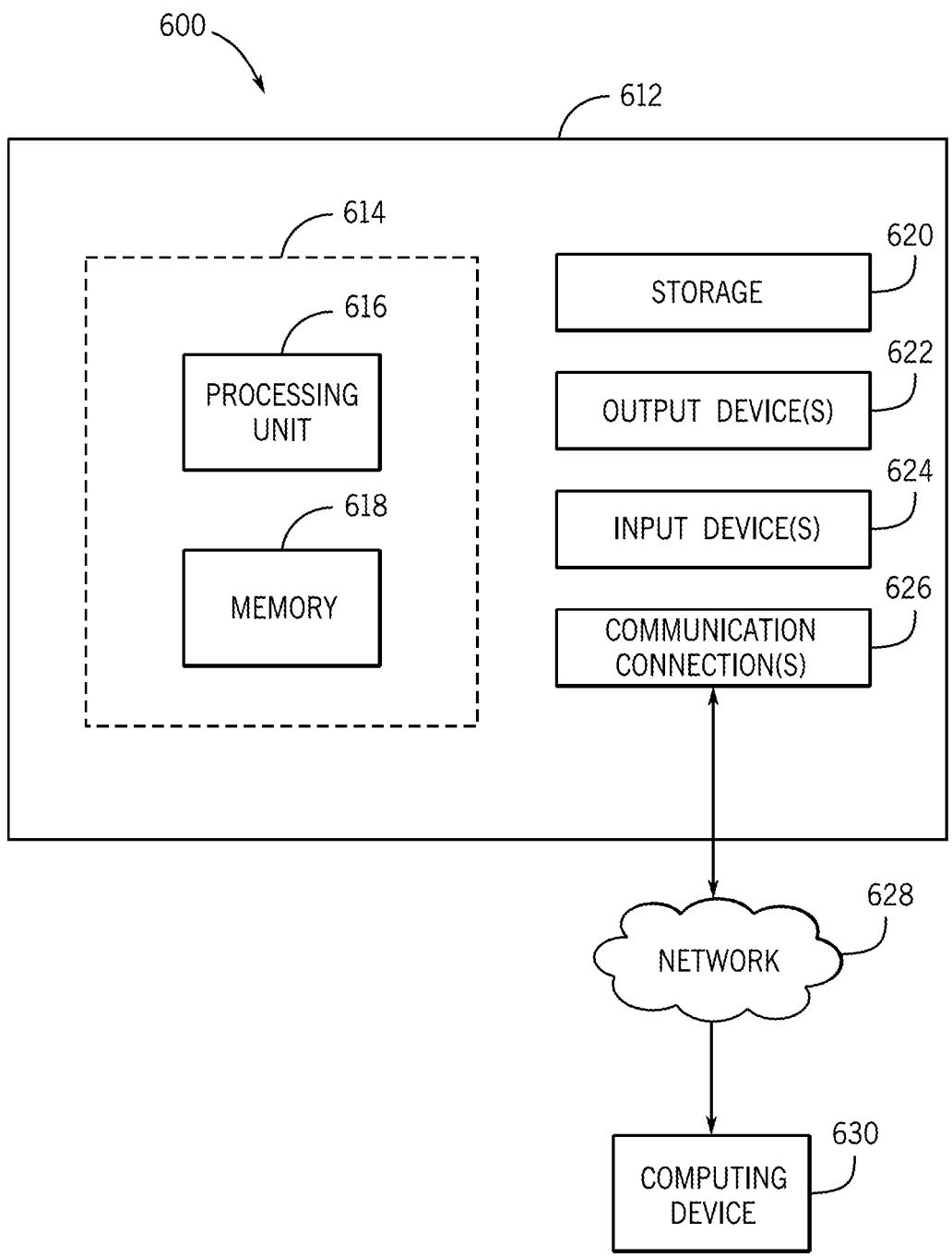
FIG. 6 is an illustration of an example computing environment where one or more of the provisions set forth herein are implemented, according to one or more embodiments.

For one or more of the figures herein, one or more boundaries, such as boundary 614 of FIG. 6, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, programming data or 'data' may include program guide data, television or media programming data, TV program data, electronic programming data, electronic program guide (EPG) data, etc.

As used herein, a 'remote' or remote system may include a remote control, a remote control device, a television remote, a multimedia remote, a mobile device, a tablet, a smartphone, or any other device equipped with transmitters which provide signals for controlling other devices, etc.

As used herein, a media system may include a television, a media center, a display, an entertainment system, etc.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example component diagram of a backend system 110 facilitating caching 100 of programming data on a remote system 120, according to one or more embodiments. Here, in FIG. 1, a backend system 110 may transmit programming data to the remote system 120 for the remote system 120 to cache or store. In one or more embodiments, communication between the backend system 110 and the remote system 120 may occur over a network 130, through a cable box 140, etc. It will be appreciated that the backend system 110 and remote system 120 may communicate indirectly, through multiple layers or devices, intermediary devices, according to one or more embodiments. For example, the backend system 110 and remote system 120 may communicate through a cable box 140, local area network (LAN), wide area network (WAN), the internet, etc. The network component 114 and the communication component 172 may be implemented with infrared sensors/detectors, wireless antennas/receivers, network cards, etc. Regardless, the network component 114 enables communication between the backend system 110 and the communication component 172 of the remote system 120.

The backend system 110 may include a parsing component 112, a network component 114, a formatting component 116, and a control component 118. In one or more embodiments, the backend system 110 may include the cable box 140 or one or more servers.

The remote system 120 may include an application component 162, a management component 164, a display component 166, a communication component 172, a storage component 174, and a power component 176. Further, the remote system 120 may issue commands or orders via signals to a media system 150, such as a television or a media center, for example. Here, the communication component 172 of the remote system 120 may transmit remote commands to a media system 150 or a device associated with the media system 150, such as a cable box 140, receiver, television, etc.

The backend system 110 may enable one or more programming data sets to be sliced, parsed, or divided into one or more programming data portions, wherein respective programming data portions are converted or formatted in a manner suitable for direct consumption by a remote, remote device, or remote system 120.

The backend system 110 may receive data, such as user profile data which helps identify programming available to a user of a remote system 120. The remote system 120 may include an application component 162, which collects user profile data or has the user setup a user profile, which includes user profile data.

In one or more embodiments, the application component 162 may prompt a user for user profile data by having the display component 166 render a user interface (UI) which prompts the user for such user profile data. For example, the application component 162 may cause the display component 166 to render an interface that gathers the user's zip code, cable provider, content provider, gender, age, favorites, etc. In other embodiments, the application component 162 may monitor the remote system 120, the backend system 110, or the media system 150 for user profile data.

For example, the application component 162 may monitor or detect one or more aspects or types of user profile data, such as favorites, recently watched channels, recently watched programming, program history, etc. In this way, the application component 162 may gather or infer favorites as user profile data in an automatic fashion, such as by monitoring which shows are watched or which channels are most frequently accessed, etc. Regardless, this user profile data may be communicated by the communication component 172 of the remote system through the network 130 or cable box 140 to the network component 114 of the backend system 110.

Using this user profile data, the network component 114 of the backend system may determine a programming data set which represents content available to the user of the remote system 120. In other words, the programming data set may be determined by the backend system 110 based on user profile data, which may be inferred or received in response to a prompt. In any event, the network component 114 may receive user profile data. User profile data may include zip code, cable provider, content provider, gender, age, favorite, recently watched channels, recently watched programming, program history, etc. As an example, the network component 114 may read or receive a user's zip code and the user's television or content provider to determine programming data available to the user. For example, if a first user subscribes to a cable content provider, his or her programming may be different than a second user who subscribes to a satellite content provider. In this way, the network component may determine appropriate sets of programming data for different users from a plurality or a pool of programming data sets.

In one or more embodiments, the application component 162 of the remote system 120 may initiate parsing of programming data on a backend system 110 with a command, request, or order to parse a programming data set. Further, the application component 162 of the remote system 120 may provide a backend system 110 with a command or order to parse a programming data set in a particular manner, such as based on a current battery level, a hardware configuration of the remote system 120, a time of day, a speed of an internet connection available to the remote system 120, etc. The communication component 172 may communicate this parsing order or download request to a backend system 110 or a network component 114 of a backend system 110. Here, when the network component 114 detects the request or command for parsing to be initiated, the parsing component 112 may begin parsing of the programming data set.

In other embodiments, the backend system 110 may initiate parsing automatically, without any request or command from the remote system 120.

The parsing component 112 may parse, divide, or the slice programming data of a programming data set into two or more programming data portions, chunks, slices, etc. In one or more embodiments, the parsing component 112 may divide or parse the programming data into a first programming data portion, a second programming data portion, a third programming data portion, etc. As an example, the first portion may include two days of programming data, the second portion may include twelve days of programming data, and successive portions (e.g., the third portion, the fourth portion, etc.) may include six hours of programming data. In this way, programming data portions may be cached on the backend to provide seamless interaction, once downloaded or cached on the remote system 120. In other words, because a database of programming data may include hundreds of megabytes of data, dividing the programming data into two or more portions enables battery life of the remote system 120 to be preserved and for the graphical user interface rendered by the display component 166 of the remote system 120 to run more smoothly.

Respective programming data portions may be associated with different program schedules for different days. In the example where the first programming data portion includes two days of programming data and the second programming data portion includes twelve days of programming data, the first portion may include programming data for January $1^{st}$ and January $2^{nd}$, while the second portion may include programming data for January $3^{rd}$ through January 14.

In other embodiments, the parsing component 112 may parse the programming data into programming data portions differently based on communication speeds available to a communication component 172 of a remote system 120, time of download, a status of a remote system 120, a current battery level of a remote system 120, a number of days of programming desired, a size of the programming data, one or more user preferences, etc. In other words, the parsing component 112 may generate two or more sets of programming data portions, depending on hardware, speeds, battery life, status, etc. associated with the remote system 120 of a user.

For example, a first set of programming data may have a first programming data portion associated with two days of programming data and a second programming data portion associated with twelve days of programming data, while a second set of programming data may have a first programming data portion associated with five days of programming data and a second programming data portion associated with nine days of programming data. Here, if broadband or a high speed connection exceeding a speed connection threshold (e.g., greater than 50 Mbps) is detected, the backend system 110 may have the remote system 120 cache the second set of programming data as a result of the connection speed being greater than the speed connection threshold.

As another example, the parsing component 112 may parse sets of programming data based on groups, types of content, etc. For example, the parsing component 112 may generate a first programming data portion and a second programming data portion such that the first programming data portion is associated with fourteen days of content or programming data of select channels, wherein the select channels are determined based on user profile data. For example, if a user indicates that he or she enjoys children's programs or programming for toddlers, the first programming data portion may be associated with fourteen days of programming for two or three channels dedicated to toddlers, etc. In this way, the parsing component 112 may perform parsing based on grouped results. In this way, the parsing component 112 of the backend system 110 may reduce download to access times in a custom manner.

The formatting component 116 may convert one or more of the programming data portions into a format associated with different remote system 120s. For example, for remote system 120s running on an Android™ operating system, the formatting component 116 may convert respective programming data portions into a SQLite database format. Accordingly, in one or more embodiments, the formatting component 116 may convert the first programming data portion into SQLite database format, wherein the first programming data portion represents two days of programming data (e.g., divided by file size). Similarly, the formatting component 116 may convert the second, third, fourth, etc. programming data portions into SQLite database format, wherein the second programming data portion represents the next twelve days of programming data, and successive programming data portions represent six hours of programming, for example.

In this way, the formatting component 116 generates programming data portions which are suitable for direct consumption on a remote system 120, without any need for further processing by the remote system 120. By generating files on the backend using an Android™ database format (e.g., a remote configuration or a configuration of the remote), the need to do data (e.g., JSON) parsing on the client or the remote system 120 is mitigated or eliminated. Thus, once the programming data portions are downloaded to the remote system 120, the remote system 120 may utilize them, since the programming data portions are already in an appropriate format. In this way, battery drain on the remote system 120 is mitigated.

For example, by eliminating parsing remote system 120 side, this also nullifies or mitigates battery and processing load which would have been placed on components of the remote system 120, thereby improving battery consumption, and mitigating UI sluggish-ness due to overuse of a processor, processing unit, etc. of the remote system 120.

In parsing or formatting one or more programming data portions, program data or associated programming data portions may be downloaded or cached faster for other users residing in the same zip code and/or having the same content provider as a first user. Explained another way, because the parsing or formatting happens or occurs on a backend system 110 and is stored on the backend system 110, users in similar situations (e.g., in the same zip code with the same content provider) may receive at least some of the same programming data portions, thus mitigating the amount of processing or calculations required from the backend system 110.

The network component 114 may transmit one or more programming data portions to a remote system 120. For example, the network component 114 may transmit a first programming data portion to the communication component 172 of the remote system 120. In other words (assuming that the first programming data portion represents two days of programming data), the network component 114 may send a two day database to the remote system 120 or client, which downloads or caches this file and completes onboarding. At this point, the remote system 120 may begin to view or preview the locally cached programming data from the first programming data portion.

The communication component 172 of the remote system 120 may receive programming data portions, including the first programming data portion. In one or more embodiments, the communication component 172 may receive programming data which was previously divided, sliced, parsed, processed, formatted, etc.

The communication component 172 may receive the first programming data portion from the backend system 110. In other words (assuming that the first programming data portion represents two days of programming data), the communication component 172 may receive a two day database from a server or backend system 110. Once the first programming data portion is received and stored on the remote system 120, onboarding is complete. Further, the communication component 172 may receive additional programming data portions, such as a second programming data portion, a third programming data portion, etc.

Because respective programming data portions have been previously processed, parsed, formatted, etc., download times, processing power required from the remote system 120, and battery consumption are mitigated. In other words, parsing JSON data on the backend relieves the burden on the processor or processing unit of the remote system 120, thus mitigating battery consumption and overall slowness in the UI, applications run by the application component 162 or renderings by the display component 166, for example.

Accordingly, the communication component 172 of the remote system 120 enables interplay, communication, or interactions to occur between the remote system 120 and a backend system 110 to seamlessly update content, such as programming data or programming data portions of the storage component 174 of the remote system 120, such that the remote system 120 may maintain or store relevant programming schedules or recommendations even when no Internet connection or Wi-Fi connection is available, connectivity to a cable box 140 or network 130 is lost, etc.

The management component 164 of the remote system 120 may manage states or modes of the remote system 120 before, during, or after the process of onboarding, caching, downloading, or receiving programming data, programming data portions, etc. In other words, the management component 164 may ensure functionality of the remote system 120, regardless of the state of the onboarding for the remote system 120 or the amount of programming data portions received, downloaded, or cached. Explained yet another way, the management component 164 may make it possible to use the remote even when the first programming data portion is in the process of being received or when programming data is not yet available, for example. The management component 164 may enable use of the remote system 120 in a variety of different states or mode, such as when a first programming data portion is not yet downloaded, the first programming data portion is downloading or in the process of being received, the first programming data portion is completely downloaded or fully received, etc. The management component 164 may check to see if content is available for local use on the storage component 174 before enabling the communication component 172 to connect to other systems (e.g., system 110), the internet, the cable box 140, etc., thereby conserving battery life for the remote system 120. In other words, the management component 164 may prioritize use of locally cached content or programming data portions over data from the internet, for example.

The management component 164 may determine one or more subsets of programming data portions to download or cache based on storage space available, user interests, user profile data, etc. For example, if a user typically watches sports, merely programming data portions for channels associated with sports or sports related programming data portions may be downloaded or cached on the storage component 174.

The storage component 174 may cache, download, house, store one or more programming data portions, which may be indicative of recommendations for related media content. In other words, the storage component 174 enables a remote system 120 to hold or contain relevant programming data for a predetermined time period, without loading from the network or internet each time the user accesses a program guide function on the remote system 120 or a recommended function on the remote system 120.

In one or more embodiments, the remote system 120 may download, cache, onboard, or store a number of days of programming data within the storage component 174, thereby enabling the remote system 120 to function as a content-driven remote system 120, even when an Internet connection is lost or disconnected, for example. Further, even when an internet connection is available, access times for locally stored or locally cached programming data portions or recommendations is typically faster than access times for programming data accessed via the internet.

As an example, the storage component 174 may cache fourteen days of programming data at a time. In one or more embodiments, the number of days of programming data cached may be based on a browsing history of the user. In other words, if a user, in the past, has browsed only as far as three days in advance, the management component 164 may adjust the programming data portions such that a total number of days associated with programming data portions which are stored on the storage component 174 is associated with seven days of content, rather than fourteen, for example. However, if a user typically browses farther in advance, such as a month in advance, for example, the management component 164 may adjust the amount or number of programming data portions cached or downloaded to account for this type of browsing.

In other words, the storage component 174 enables the remote system 120 to display or house appropriate contents, recommendations, etc. based on the time without having to reconnect to the internet, thereby saving valuable battery power. Because the storage component 174 caches one or more programming data portions, which are in a format readable by the remote system 120, searching for programming using the remote system 120 is possible upon completion of onboarding or updating of respective programming data portions.

In one or more embodiments, the storage component 174 may receive, download, or store programming data portions using JavaScript Object Notation (JSON). Thus, different programming data portions, such as the first programming data portion, the second programming data portion, etc. may be received from the backend system 110 via JSON.

In one or more embodiments, the power component 176 may place the remote system 120 or remote device in a sleep mode automatically or based on a period of inactivity which exceeds an inactivity threshold (e.g., no buttons pushed or interactivity with a user for sixty minutes, etc.). In other words, onboarding or downloading of programming data portions may occur during a sleep phase of the remote system 120, or during periods when the remote system 120 is not in use.

When entering sleep mode, the power component 176 may transmit a sleep signal to a backend system 110 or a network component 114 of a backend system 110, alerting the backend system 110 that programming data may be pushed. In one or more embodiments, the sleep signal is only sent when less than a threshold amount of programming data is stored on the remote system 120 or the storage component 174 of the remote system 120, for example. Here, if merely two days of programming data are stored on the storage component 174, and the remote system 120 or remote device enters sleep mode, the sleep signal may be sent to the backend system 110, thereby causing the backend system 110 to transmit additional programming data portions to the remote system 120 or remote device. For example, the second programming data portion of programming data (e.g., associated with twelve days of programming data) may be downloaded as the additional programming data portion. In this way, the power component 176 may manage updates to the programming data on the remote system 120.

Further, the power component 176 may transmit or send the sleep signal based on a current battery level associated with the remote system 120 or an estimated programming data portion size. As an example, if the first programming data portion represents two days of programming data, the second programming data portion represents twelve days of programming data, and the third programming data portion represents six hours of programming data, the power component 176 may transmit the sleep signal (e.g., causing programming data to be cached or downloaded to the remote system 120 or storage component 174 of the remote system 120) based on the battery level and which programming data portions are next in line to be downloaded or cached. Assuming that the battery life is at 30%, the power component 176 may forego transmission of the sleep signal to the backend system 110 if the second programming data portion is next in line to be cached, but transmit the sleep signal to the backend system 110 if the third programming data portion is to be cached on the remote system 120 (e.g., due to the size of the programming data portions and the battery level). Accordingly, the power component 176 may manage when the remote system 120 goes to sleep, and thus when receiving or download of programming data portions occurs.

In one or more embodiments, the power component 176 may prioritize, terminate, or pause receiving of a programming data portion based on user activity or a level of user activity. For example, if a user interacts with a remote system 120 after a sleep signal has been sent, but before the programming data portion is downloaded, cached, or fully received, the power component 176 may prioritize user interactions over downloading or receiving of the corresponding programming data portion. Alternatively, the power component 176 may pause the downloading until the remote system 120 enters another sleep mode based on the inactivity threshold or a second inactivity threshold. In this way, the power component 176 may prioritize use of the remote system 120 over downloading or onboarding programming data portions over sleep, non-use, etc.

In yet other embodiments, the power component 176 may prioritize, terminate, or pause receiving of a programming data portion based on anticipated user activity, scheduled use, etc. For example, if a remote system 120 enters a sleep mode, due to a period of inactivity which exceeds an inactivity threshold, the power component 176 may withhold or forgo sending or transmitting the sleep signal based on scheduled content that a user is scheduled to watch, has saved, made a favorite, bookmarked, watched historically, etc. In other words, if a user has tuned in to a program regularly on a specific day and/or time, the power component 176 of the remote system 120 may avoid going to sleep at those times or avoid receiving or downloading programming data portions around those times, thereby providing the user with more hardware resources at those times.

When the network component 114 detects that a remote system 120 is ready to receive additional programming data portions, respective data portions may be transmitted to the remote system 120 or to the communication component 172 of the remote system 120. For example, the network component 114 may transmit the second programming data portion to the remote system 120, wherein the second programming portion represents twelve days of programming data and is converted to SQLite database format. In this way, the first and second programming data portions may be configured to represent two weeks of programming data collectively, thereby providing the remote system 120 with fourteen days of programming data.

Explained another way, the network component 114 may transmit a second programming data portion to the remote system 120 client after onboarding is completed. Here, the network component 114 of the backend system 110 may transmit the remaining twelve days as another or a second SQLite database, thus completing caching of fourteen days of data. As discussed, further portions may be cached for in six-hour increments (e.g., on the backend), and be transmitted accordingly.

The control component 118 may poll or wait for a sleep signal from a remote system 120. The sleep signal may act as a trigger for transmission of one or more programming data portions. For example, when a sleep signal is received, the network component 114 may begin transmission of a corresponding programming data portion. In one or more embodiments, the sleep signal may include or indicate which programming data portion should be transmitted to a remote system 120. In this way, content may be updated for a remote system 120 during a sleep mode for the remote system 120.

The control component 118 may also receive a pause signal from the remote system 120 which causes the backend system 110 to temporarily pause transmission of a programming data portion, such as until another sleep signal or a un-pause signal is received.

In one or more embodiments, the remote system 120 is ready to receive additional programming data portions when the remote system 120 goes into sleep mode. Here, the remote system 120 or the communication component 172 of the remote system 120 may transmit a sleep signal to the backend system 110 or the network component 114 of the backend system 110 indicating that the remote system 120 is going to sleep or entering sleep mode. Interruptions may be provided as pause or terminate signals from the remote system 120.

The application component 162 may provide a user with the ability to search for programming on their remote system 120. For example, users may be able to search content locally stored on the remote system 120, such as the programming data or one or more of the programming data portions (e.g., including the next fourteen days of programming). If the desired content is unavailable, but an internet connection or a connection to a cable box 140 is available, the application component 162 may initiate a search via the internet or on the cable box 140. In one or more embodiments, the application component 162 may prioritize searching on the cable box 140 over searching on the internet when both connections are available. The application component 162 may present search results based on type of content, such as by grouping sports, films, by age appropriateness, by parental rating, etc. Users may be able to use filters provided by the application component 162 to narrow search results from the application component 162.

In one or more embodiments, the display component 166 may render a user interface (UI) which enables a user to view programming data or recommended programming data without the need for a connection to the internet, a connection to a cable box 140, television, etc.

The display component 166 may display one or more recommendations, one or more programming schedules, etc. within the UI based on a current or a local date or local time associated with the remote system 120 and one or more of the programming data portions (e.g., first programming data portion, second programming data portion, third programming data portion, etc.). For example, if the storage component 174 has cached a first programming data portion associated with two days of programming data and a second programming data portion associated with twelve days of programming data, the display component 166 may render programming data for display, thereby enabling a user to see or view up to fourteen days of programming content or programming data based on the cached programming data.

Further, to enhance the viewing experience, the management component 164 may enable programming data to be downloaded when a connection is available such that a user would not be able to distinguish between cached programming data and programming data retrieved on the fly. As an example, if the storage component 174 has completed receiving the first programming data portion, but has not yet completed receiving the second programming data portion, the management component 164 may present the first two days of programming (e.g., associated with the programming data portion). If a user prompts the remote system 120 for additional programming data for a specific channel and an internet connection is available, the management component 164 may retrieve that additional programming data on the fly. This additional programming data may be cached or stored on the storage component 174 in one or more embodiments. Alternatively, the additional programming data may be discarded and downloaded or cached according to the next programming data portion or increment. If no internet connection is available, the management component 164 may remove the option for the user to prompt for addition programming data.

The display component 166 may render a user interface which enables a user to scroll through different channels by swiping up and down and view different programming (e.g., into the future or at different time slots) associated with respective channels by swiping left and right, for example.

In one or more embodiments, the display component 166 may render a user interface to include a date, a current time, a battery level associated with the remote system 120, etc. In one or more embodiments, the display component 166 may render one or more program suggestions based on one or more of the programming data portions and user profile data. The display component 166 may render these program suggestions to include a preview icon, a channel, a channel name, a program name, a program time, a current progress associated with the program, etc. When a program suggestion is selected by a user, the communication component 172 may transmit a signal to a cable box 140, television, receiver, etc. associated with activating the program suggestion. For example, if the television is off, the communication component 172 may provide a power signal to the television, pause for a predetermined time period, change to an input (e.g., cable, antenna, etc.) associated with the program suggestion, and select the appropriate channel or other selection for the program suggestion to otherwise being playback of the corresponding content. In other embodiments, when the program suggestion is selected, a show or program detail page may be rendered.

One or more of the following figures may be described with reference to FIG. 1 and/or one or more components of FIG. 1.

In one or more embodiments, one or more components (e.g., 162, 164, 166, 172, 174, 176, etc.) of the remote system 120 may be implemented in the cable box 140 or the media system 150. In other words, the cable box 140 or the media system 150 may implement caching of programming data in a manner similar to the caching of the remote system 120. As an example, the cable box 140 may have a storage unit or component that receives programming data portions which are allocated into different segments associated with various sizes of caches or programming partitions. In this way, caching of programming data may be achieved on other devices, such as a set top box of a media system 150 or the cable box 140, for example.

Figure 2:
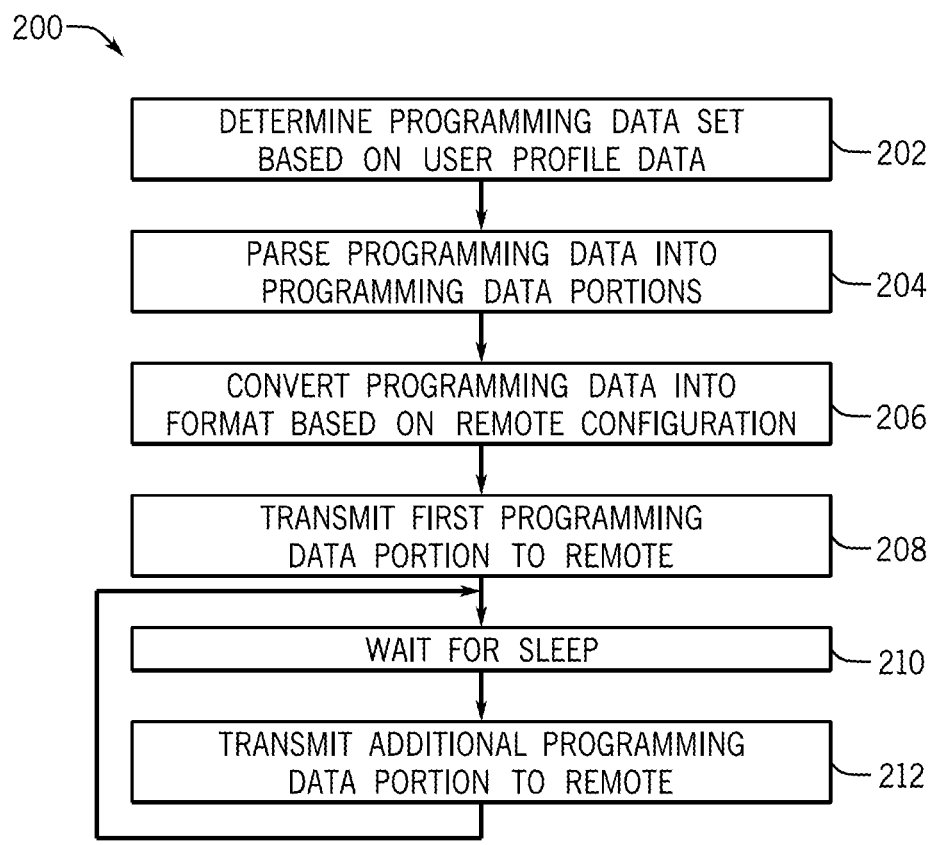
FIG. 2 is an illustration of an example flow diagram of a method for caching programming data, according to one or more embodiments.

FIG. 2 is an illustration of an example flow diagram of a method 200 for caching programming data, according to one or more embodiments. At 202, a programming data set is determined based on user profile data. At 204, programming data is parsed into programming data portions. At 206, programming data is converted into an appropriate format based on a configuration of the remote. At 208, the first programming data portion is transmitted to the remote. At 210, a sleep signal is checked. At 212, additional programming data portions are transmitted upon receiving a sleep signal. Once respective additional programming data portions a transmitted, the cycle may continue by waiting for more sleep signals, and transmitting further additional programming data portions.

Figure 3:
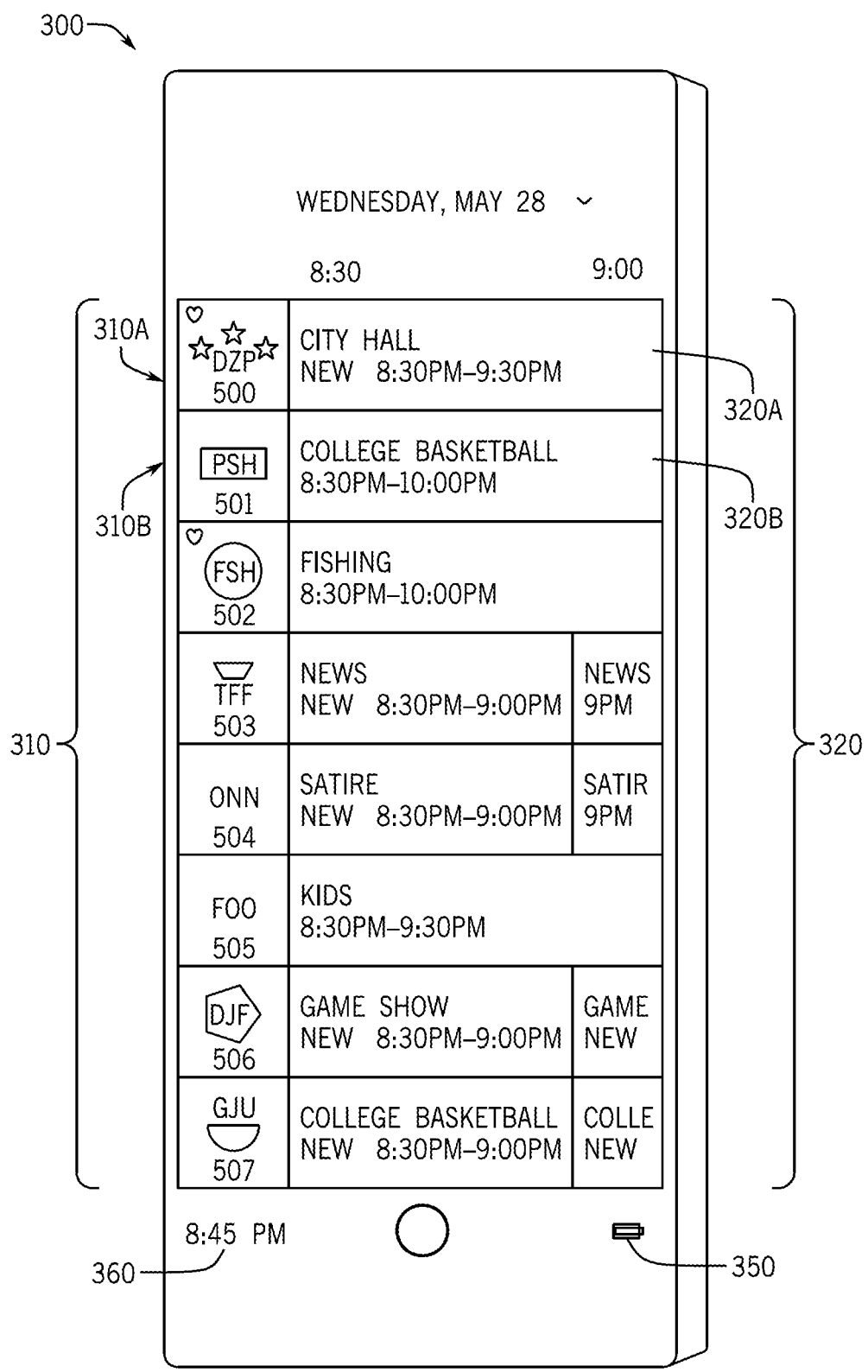
FIG. 3 is an illustration of an example remote system displaying cached programming data, according to one or more embodiments.

FIG. 3 is an illustration of an example remote system 300 displaying cached programming data, according to one or more embodiments. The program data rendered by the remote system 300 may include a list of channels 310, including channels 310A, 310B, etc. Further, the program data may include a list of programs 320, including programs 320A, 320B, etc. The remote system 300 may display the battery life 350 and the date or time 360. A user may be presented with future listings for respective channels 310 when a swipe from the right to the left of the remote system 300 is detected.

Figure 4:
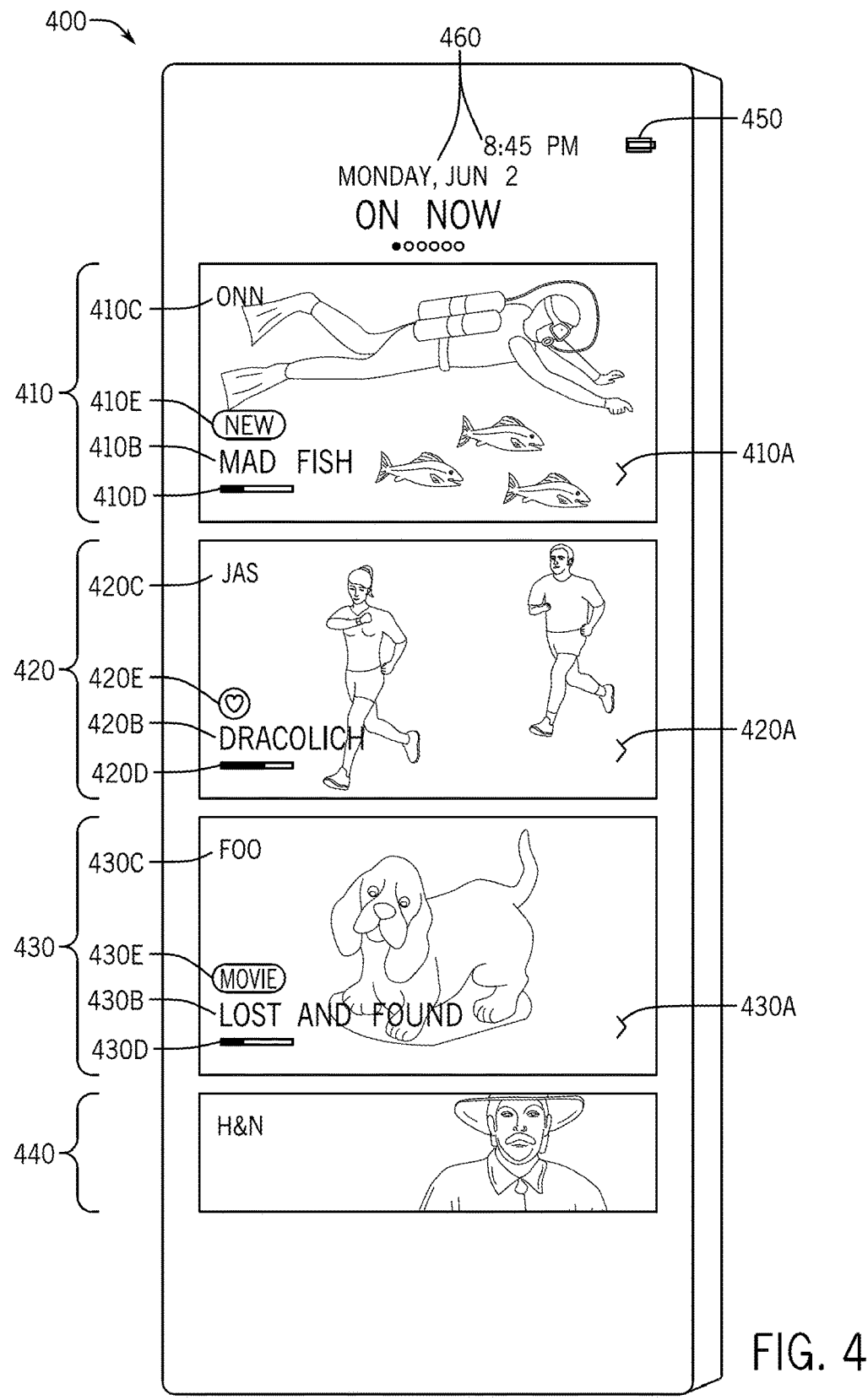
FIG. 4 is an illustration of an example remote system displaying cached programming data, according to one or more embodiments.

FIG. 4 is an illustration of an example remote system 400 displaying cached programming data, according to one or more embodiments. Here, four program suggestions 410, 420, 430, and 440 are displayed on the remote system 400. Each program suggestion may include an associated channel (e.g., 410C, 420C, 430C, etc.), an identifier (e.g., 410E, 420E, 430E, etc.), a program name (e.g., 410B, 420B, 430B, etc.), and a progress bar (e.g., 410D, 420D, 430D, etc.). Further, for a preview or program suggestion, a button (e.g., 410A, 420A, 430A, etc.) may be provided. In one or more embodiments, the buttons (e.g., 410A, 420A, 430A, etc.) may be time advancement buttons which, when pressed, provide a preview of the next time slot's programming data for the corresponding channel (e.g., 410C, 420C, 430C, etc.) based on programming data portions stored on the remote system 400. In other embodiments, the buttons (e.g., 410A, 420A, 430A, etc.) may be program detail buttons which, when pressed, provide greater detail of programming data information for the corresponding program name (e.g., 410B, 420B, 430B, etc.) based on programming data portions stored on the remote system 400. It will be appreciated that the management component 164 may determine whether the preview of the next time slot's programming data or the detailed programming data information is available on the storage component 174 of the remote system 120, and access either the storage component 174 or initiate a search, such as over the network 130 or via the cable box, for example.

In one or more embodiments, the progress bars (e.g., 410D, 420D, 430D, etc.) may be based on a current time, such as time 450 as well as one or more programming data portions.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification, as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

Figure 5:
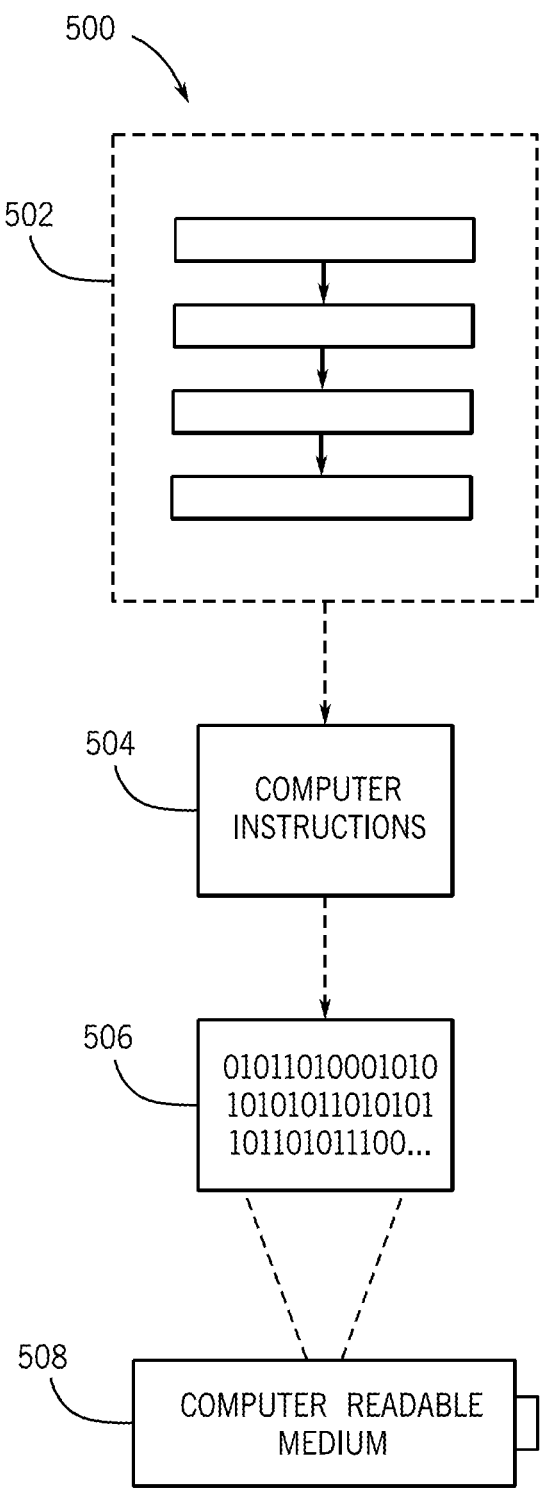
FIG. 5 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 504 may be configured to perform a method 502, such as the method 200 of FIG. 2. In another embodiment, the processor-executable instructions 504 may be configured to implement a system, such as the backend system 110 or the remote system 120 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 6 and the following discussion provide a description of a suitable computing environment to implement embodiments of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, handheld or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one or more embodiments provided herein. In one configuration, computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other embodiments, device 612 includes additional features or functionality. For example, device 612 may include additional storage such as removable storage or non-removable storage, including, but not limited to, magnetic storage, optical storage, etc. Such additional storage is illustrated in FIG. 6 by storage 620. In one or more embodiments, computer readable instructions to implement one or more embodiments provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 612. Any such computer storage media is part of device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 612 includes input device(s) 624 such as keyboard, mouse, pen, voice input device, touch input device, infrared cameras, video input devices, or any other input device. Output device(s) 622 such as one or more displays, speakers, printers, or any other output device may be included with device 612. Input device(s) 624 and output device(s) 622 may be connected to device 612 via a wired connection, wireless connection, or any combination thereof. In one or more embodiments, an input device or an output device from another computing device may be used as input device(s) 624 or output device(s) 622 for computing device 612. Device 612 may include communication connection(s) 626 to facilitate communications with one or more other devices.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems, implementations, or applications. Also that various presently unforeseen or unanticipated alternatives, modifications, variations or improvements therein may be subsequently made by those skilled in the art which are also intended to be encompassed by the following claims.

The invention claimed is:

1. A system, comprising:
    at least one memory storing computer-executable instructions; and
    at least one processor configured to access the at least one memory and execute the computer-executable instructions to:
        identify user profile data;
        determine digital content data, for a remote control device that controls a media system, based at least in part on the user profile data;
        parse the digital content data into two or more digital content data portions, the two or more digital content data portions including a first digital content data portion having a first format and a second digital content data portion having the first format;

convert the first digital content data portion and the second digital content data portion into a second format based at least in part on a configuration of the remote control device;

identify a sleep signal received from the remote control device, wherein the sleep signal is indicative of a sleep mode of the remote control device and comprises an indication of the first digital content data portion; and send, to the remote control device, at least the first digital content data portion based at least in part on the sleep signal.

2. The system of claim 1, wherein the user profile data includes a zip code and a content provider.

3. The system of claim 1, wherein the first digital content data portion is associated with two days of programming data and the second digital content data portion-is associated with twelve days of programming data.

4. The system of claim 1, wherein to parse the digital content data comprises to parse the digital content data based at least in part on file sizes of the first digital content data portion and the second digital content data portion.

5. The system of claim 1, wherein the first digital content data portion and the second digital content data portion include channel names, program names, or identifiers.

6. A method, comprising:
determining, by one or more processors of a system, digital content data, the digital content data configured for a remote control device that controls a media system, based at least in part on user profile data;

parsing, by the one or more processors, the digital content data into two or more digital content data portions, the two or more digital content data portions including a first digital content data portion having a first format and a second digital content data portion having the first format;

converting, by the one or more processors, the first digital content data portion and the second digital content data portion into a second format based at least in part on a configuration of the remote control device;

identifying, by the one or more processors, a sleep signal received from the remote control device, wherein the sleep signal is indicative of a sleep mode of the remote control device and comprises an indication of the first digital content data portion; and sending, by the one or more processors, to the remote control device, at least the first digital content data portion based at least in part on the sleep signal.

7. The method of claim 6, wherein the user profile data includes a zip code and a content provider.

8. The method of claim 6, wherein the first digital content data portion is associated with two days of programming data and the second digital content data portion is associated with twelve days of programming data.

9. The method of claim 6, wherein the first digital content data portion and the second digital content data portion include channel names, program names, or identifiers.

10. A remote control device, comprising:
at least one memory storing computer-executable instructions; and at least one processor configured to access the at least one memory and execute the computer-executable instructions to:
identify two or more digital content data portions, the two or more digital content data portions including a first digital content data portion having a first format and a second digital content data portion having the first format;

store the first digital content data portion and the second digital content data portion;

generate a sleep signal based at least in part on a period of inactivity which exceeds an inactivity threshold;

send the sleep signal, wherein the sleep signal is indicative of a sleep mode of the remote control device and comprises an indication of a third digital content data portion; and identify the third digital content data portion received based at least in part on the sleep signal.

11. The remote control device of claim 10, further comprising a display configured to render a user interface and at least the first digital content data portion.

12. The remote control device of claim 10, wherein the at least one processor is further configured to gather user profile data.

13. The remote control device of claim 12, wherein the user profile data includes a zip code and a content provider.

14. The remote control device of claim 10, wherein the first digital content data portion is associated with two days of programming data and the second digital content data portion is associated with twelve days of programming data.

15. The remote control device of claim 10, wherein the first digital content data portion, the second digital content data portion, and the third digital content data portion include channel names, program names, or identifiers.

16. The remote control device of claim 10, wherein the remote control device controls a media system that includes a cable box or a set top box.

17. The system of claim 1, wherein to parse comprises to parse the first digital content data portion and the second digital content data portion based at least in part on at least one of:
a communication speed of a communication component on the remote control device,
a time to download the first digital content data portion and the second digital content data portion to the remote control device,
a status of the remote control device,
a data size of the first digital content data portion and the second digital content data portion, or
a user preference of the remote control device.

18. The system of claim 1, wherein to parse comprises to parse the first digital content data portion and the second digital content data portion based at least in part on a type of content.

19. The method of claim 6, wherein the parsing comprises parsing the digital content data based at least in part on at least one of:
a communication speed of a communication component on the remote control device,
a time to download the first digital content data portion and the second digital content data portion to the remote control device,
a status of the remote control device,
a data size of the first digital content data portion and the second digital content data portion, or
a user preference of the remote control device.

20. The method of claim 6, wherein the parsing comprises parsing the digital content data based at least in part on a type of content.

* * * * *